(12) United States Patent
Shotey et al.

(10) Patent No.: US 10,322,944 B1
(45) Date of Patent: *Jun. 18, 2019

(54) EXPANDABLE WATER FILTER RESERVOIR

(71) Applicant: Bonvi Water, Inc., Scottsdale, AZ (US)

(72) Inventors: Marcus J. Shotey, Scottsdale, AZ (US); Scott Klug, Mesa, AZ (US)

(73) Assignee: Plenty Company, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/216,979

(22) Filed: Dec. 11, 2018

Related U.S. Application Data

(63) Continuation of application No. 16/006,753, filed on Jun. 12, 2018, now Pat. No. 10,150,679, which is a continuation of application No. 15/792,662, filed on Oct. 24, 2017, now Pat. No. 9,994,460, which is a continuation of application No. 15/202,365, filed on Jul. 5, 2016, now Pat. No. 9,796,599, which is a continuation of application No. 13/899,992, filed on May 22, 2013, now Pat. No. 9,382,131.

(60) Provisional application No. 61/651,963, filed on May 25, 2012.

(51) Int. Cl.
  *B01D 29/27* (2006.01)
  *C02F 1/00* (2006.01)

(52) U.S. Cl.
  CPC ........ *C02F 1/003* (2013.01); *C02F 2209/445* (2013.01); *C02F 2307/04* (2013.01)

(58) Field of Classification Search
  CPC .............. C02F 2307/00; C02F 2307/02; C02F 2307/04; C02F 2307/10; B01D 2221/02; B01D 2201/30; B01D 29/27
  USPC .......................................................... 210/87
  See application file for complete search history.

(56) References Cited

U.S. PATENT DOCUMENTS 5,733,448 A * 3/1998 Kaura ..................... C02F 1/003
                                                    210/238

* cited by examiner

*Primary Examiner* — Heidi R Kelley
*Assistant Examiner* — Akash K Varma
(74) *Attorney, Agent, or Firm* — Booth Udall Fuller, PLC

(57) ABSTRACT

An expandable water filtering pitcher having a pitcher with a top portion, a base portion and an inner wall surface defining an internal volume of the pitcher, a spout at the top portion at a pitcher opening, a handle attached to an exterior of the pitcher, a filter adapter mounted within the pitcher top portion. The filter adapter is within a reservoir comprising an opening therethrough from the top portion to the base portion of the pitcher and a reservoir sleeve movably coupled to the reservoir and top portion, at least one of the reservoir and the reservoir sleeve moveable in relation to the other between a retracted position defining a first reservoir volume within the reservoir and reservoir sleeve, and an expanded position defining a second reservoir volume within the reservoir and reservoir sleeve at least 40% larger than the first reservoir volume.

17 Claims, 13 Drawing Sheets

EXPANDABLE WATER FILTER RESERVOIR

CROSS REFERENCE TO RELATED APPLICATIONS

This application is a continuation of earlier U.S. application Ser. No. 16/006,753 entitled "Expandable Water Filter Reservoir" to Marcus Shotey et al., which was filed on Jun. 12, 2018, now pending, which application is a continuation of earlier U.S. application Ser. No. 15/792,662 entitled "Expandable Water Filter Reservoir" to Marcus Shotey et al., which was filed Oct. 24, 2017, now issued as U.S. Pat. No. 9,994,460, which application is a continuation of earlier U.S. application Ser. No. 15/202,365 entitled "Expandable Water filter Resevoir" to Marcus Shotey et al., which was filed Jul. 5, 2016, now issued as U.S. Pat. No. 9,796,599, which application is a continuation of earlier U.S. application Ser. No. 13/899,992 entitled "Expandable Water Filter Reservoir" to Marcus Shotey et al., which was filed on May 22, 2013, now issued as U.S. Pat. No. 9,382,131, which application claims the benefit of the filing date of U.S. Provisional Patent Application 61/651,963 entitled "Expandable Water Filter Reservoir" to Marcus Shotey, which was filed on May 25, 2012, the disclosures of each of which are hereby incorporated herein by reference.

BACKGROUND

1. Technical Field

Aspects of this document relate generally to water filtration pitchers.

2. Background Art

Pitchers with an attachable water filter are frequently used by consumers who wish to purify tap water before drinking or use. Typical filters couple to a reservoir which sits within the water pitcher. These reservoirs, however, are usually relatively small compared to the amount of space available within pitcher for carrying purified water. If, however, reservoir is enlarged to increase the water capacity of the reservoir, the size of the filtered water space decreases. Without it, however, it requires multiple fills of the reservoir to fill the volume of the filtered water space.

SUMMARY

Aspects of the disclosure relate to an expandable water-filtering pitcher comprising a pitcher having a top portion, a base portion and an inner wall surface defining an internal volume of the pitcher, a spout at the top portion at a pitcher opening, a reservoir mounted within the pitcher, the reservoir comprising a filter adapter comprising a reservoir opening therethrough, a filter fastener at the reservoir opening, the filter fastener adapted to removably receive a water filter, and a reservoir sleeve movably coupled to the filter adapter, at least one of the filter adapter and the reservoir sleeve moveable in relation to the other between a retracted position defining a first reservoir volume within the filter adapter and reservoir sleeve, and an expanded position defining a second reservoir volume within the filter adapter and reservoir sleeve at least 40% larger than the first reservoir volume.

Particular embodiments of the disclosure may comprise one or more of the following features. A plurality of first incremented liquid volume measurement markings visible on a wall of the pitcher base portion, and a handle coupled to an exterior of the pitcher. A second plurality of incremented liquid volume measurement markings visible on a wall of the reservoir sleeve, the second incremented liquid volume measurement markings visible on the wall of the reservoir sleeve incremented in volume measurements equal to the plurality of incremented liquid volume measurement markings visible on the pitcher base portion. The reservoir may be detachable from the pitcher. The handle may comprise a notch on an inner surface of the handle at a top portion of the handle adjacent to where the handle meets the wall of the pitcher. A top of the reservoir sleeve may be positioned above the pitcher opening when the reservoir sleeve is in the expanded position. The top of the reservoir sleeve may be at or near a plane formed at a top edge of the pitcher when in the retracted position. The reservoir sleeve may comprise a flexible bag. The reservoir sleeve may comprise a pleated collapsible wall. A plurality of bias members positioned between the reservoir sleeve and the filter adapter, wherein the bias members are more compressed when the reservoir sleeve is in the expanded position and the bias members are less compressed when the reservoir sleeve is in the retracted position. A filter replacement display coupled to the pitcher, the replacement display responsive to a counting device operatively associated with the spout of the pitcher and counting movement of the spout on the pitcher. The counting device may be configured to count the number of pours of liquid from the pitcher and the filter replacement display is configured to indicate when an approximated threshold for expiration of the filter is reached based on an approximated volume of water poured through the spout.

An aspect of the disclosure relates to an expandable water filtration device comprising a filter adapter positioned within a pitcher and separating the pitcher into an upper region and a lower region, a reservoir opening between the lower region and the upper region formed through the filter adapter, a filter fastener at the reservoir opening, the filter fastener adapted to removably receive a water filter within the reservoir opening, a sleeve movably coupled to the upper region, the sleeve moveable in relation to the upper region between a retracted position and an expanded position, an upper volume defined by the available space in the upper region of the pitcher and the sleeve, the upper volume when the sleeve is in the expanded version being at least 40% larger than the upper volume when the sleeve is in the retracted position, and a base volume defined by the available space in the base region of the pitcher when the sleeve is in the retracted position.

Particular embodiments may comprise one or more of the following features. The lower region may further comprise a plurality of first incremented liquid volume measurement markings visible on a wall of the lower region. A second plurality of incremented liquid volume measurement markings visible on a wall of the sleeve, the second incremented liquid volume measurement markings visible on the wall of the sleeve incremented in volume measurements equal to the plurality of first incremented liquid volume measurement markings visible on a wall of the lower region. A top of the sleeve may be positioned above the pitcher opening when the sleeve is in the expanded position. The sleeve may comprise a flexible bag. The sleeve may comprise a pleated collapsible wall. A plurality of bias members positioned between the sleeve and the upper region, wherein the bias members are more compressed when the sleeve is in the expanded position and the bias members are less compressed when the sleeve is in the retracted position.

An aspect of the disclosure relates to an expandable water-filtering pitcher comprising a pitcher comprising a closed base end, one or more sidewalls extending from the closed base end towards an open top end, and a spout extending from the open top end toward the base end, an expandable reservoir removably coupled to the pitcher, the expandable reservoir comprising a reservoir opening, one or more filter fasteners adjacent the reservoir opening and configured to removably couple a water filter to the expandable reservoir, and a flexible material that expands the reservoir into the pitcher when water is held within the expandable reservoir and retracts as water passes from the expandable reservoir to the pitcher through the reservoir opening.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation and assembly procedures for an electrical box will become apparent for use with implementations of an electrical box from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical box.

Filtering water with a water filter mounted within a pitcher provides a convenient filtering method for users. However, users of a conventional pitcher mounted water filter are limited by the amount of space within the pitcher for unfiltered and filtered water. Embodiments of an expandable water filter contemplated and disclosed herein are advantageous to conventional pitcher mounted water filters. Whereas conventional pitcher mounted water filters are limited to the capacity of the pitcher itself, embodiments of an expandable water filtering pitcher disclosed herein provide additional water capacity beyond the pitcher—thus requiring fewer refills relative to the volume of the pitcher.

Figure 1:
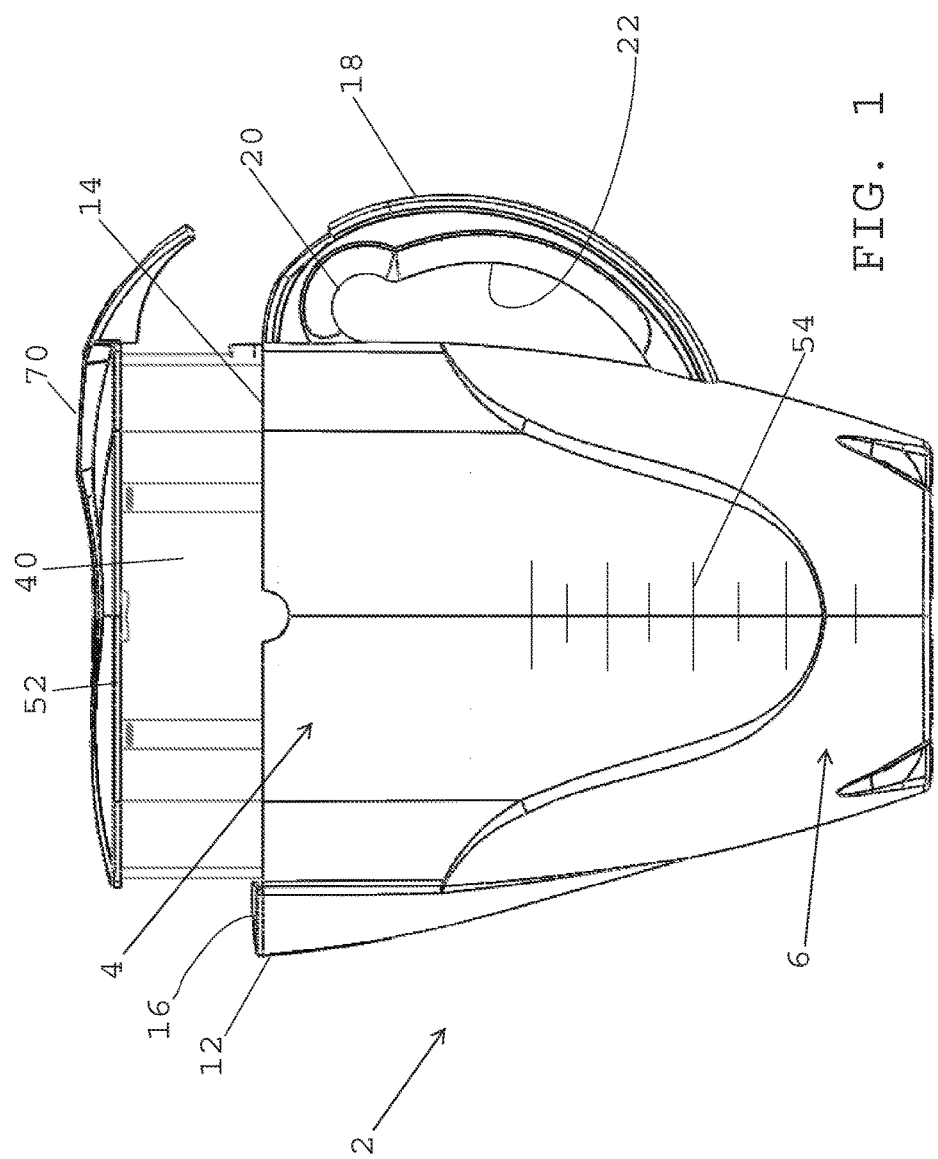
FIG. 1 is a side view of first embodiment of an expandable water-filtering pitcher.
Figure 2:
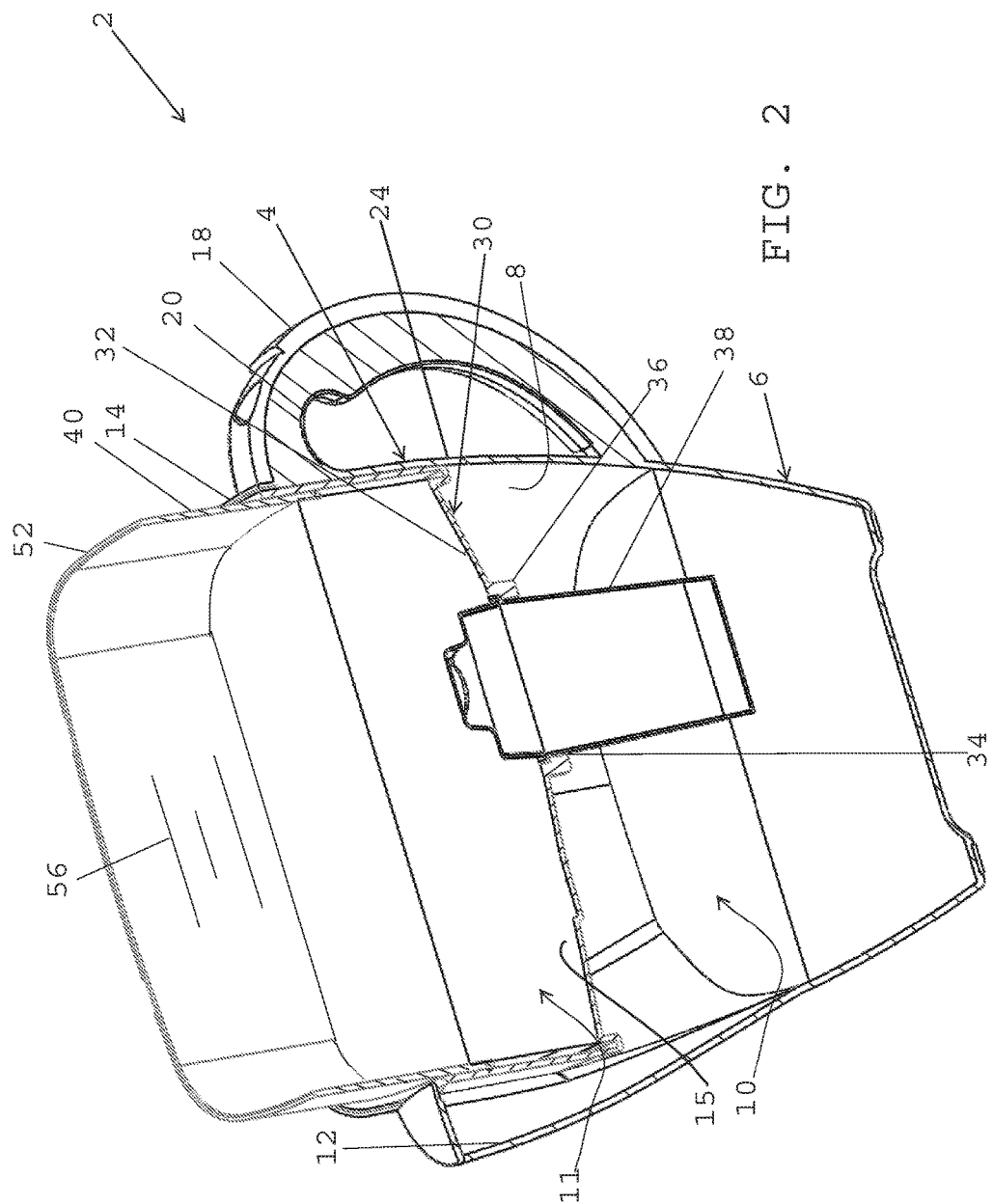
FIG. 2 is a cross-sectional perspective view of a first embodiment of an expandable water-filtering pitcher.
Figure 3:
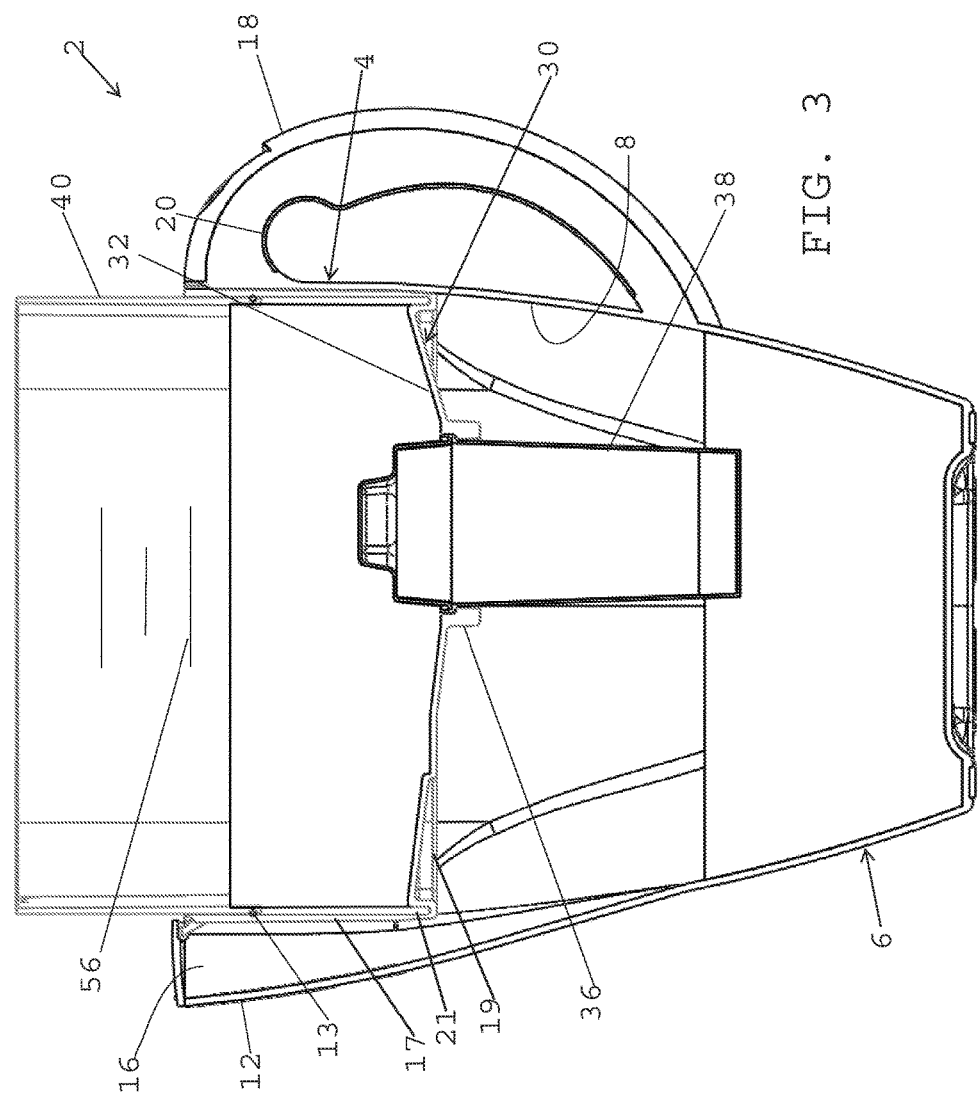
FIG. 3 is a cross-sectional side view of a first embodiment of an expandable water-filtering pitcher.

As shown in an exemplary embodiment illustrated in FIGS. 1 and 2, one or more embodiments of an expandable water-filtering pitcher comprise a pitcher 2 and a reservoir 30. The pitcher typically comprises a top portion 4 comprising an opening extending therethrough and a base portion 6 comprising a closed base wall opposite the opening of the top portion 4. Although reference is made to a top portion 4 and a base portion 6, these portions are not limited to a top or base portion, as other positioning is contemplated, such as but not limited to upper and lower regions, or merely first and second portions posited anywhere on the pitcher 2. The pitcher 2 further comprises an inner wall surface 8 defining an internal volume of the pitcher 2. The internal volume is typically divided into a lower internal volume 10 in the base portion of the pitcher 2 and an upper internal volume 11 in the top portion 4 of the pitcher 2. Unless otherwise specified herein, the pitcher 2 may comprise any shape or configuration known in the art.

One or more embodiments of a pitcher 2 further comprise a handle 18 on an exterior 24 of the pitcher 2. The handle 18 may comprise any handle known in the art or otherwise suitable for holding the pitcher 2. In particular embodiments, the handle 18 comprises a notch 20 on an inner surface 22.

The notch 20 provides additional grip and/or support for a user to pouring or handling of the pitcher 2. The pitcher 2 typically also comprises a spout 12 that allows liquid to be poured from the pitcher 2 without removal of the reservoir 30. In one or more embodiments, the spout 12 comprises a channel that allows fluid communication between the internal volume 10 of the pitcher 2 below the reservoir 30 and a pitcher opening 16 at the top plane 14 of the pitcher 2. The channel may extend from the bottom of the pitcher 2, or alternatively may begin anyway between the top portion 4 and the base portion 6 that allows for the fluid communication described herein.

Although not visible in FIG. 1, one or more embodiments of an expandable water-filtering pitcher comprise a reservoir 30 mounted with the pitcher 2 (see, for example, FIG. 2). The reservoir 30 is typically mounted within the top portion 4 of the pitcher 2 to allow for sufficient volume of filtered water. In various adaptations, however, the reservoir 30 may be mounted anywhere within the pitcher 2. One or more embodiments of a reservoir 30 comprise a filter adapter 32 and a reservoir sleeve 40. Particular embodiments of the filter adapter 32 comprise a reservoir opening 34 or passage extending therethrough such that when no water filter 38 is present, the top portion 4 and base portion 6 of the pitcher 2 are in fluid communication with each other through the reservoir opening 34. In other words, the internal volume 10 of the pitcher above the filter adapter 32 is separated from the internal volume 10 of the pitcher 2 below the filter adapter 32 by the reservoir 30 itself, with the exception of the reservoir opening 34 that extends through the filter adapter 32. As shall be explained subsequently in additional detail, liquid within the filter adapter 32 is transferred to the base portion 6 of the pitcher through the reservoir opening 34, but typically only through a water filter 38 placed within the reservoir opening 34.

In one or more embodiments, the filter adapter 32 comprises at least a base wall 15 through which the reservoir extends. In embodiments wherein the filter adapter 32 comprises only a base wall 15, the base wall 15 of the filter adapter 32 is mounted within the pitcher 2 such that the only fluid communication from the top portion 4 of the pitcher 2 to the bottom portion 6 of the pitcher is through the reservoir opening 34. In alternative embodiments, the filter adapter 32 further comprises one or more sidewalls 17 coupled to the base wall of the filter adapter 32. The sidewalls 17 further assist in allowing fluid communication only through the reservoir opening 34. In particular embodiments, the sidewalls 17 of the reservoir are shaped complementary to the top portion 4 of the pitcher 2 such that the filter adapter 32 nests within at least a portion of the top portion 4 of the pitcher.

As illustrated in the filter adapter 32, 132 embodiments shown in FIGS. 2-4, 6, 8 and 9, the base wall 15 of various reservoir embodiments comprise a sloped base wall 15. The slope of the base wall 15 is typically sloped towards the reservoir opening 34 to allow liquid within the reservoir to most effectively flow towards and through the water filter 38 as the force of gravity pulls the water downward. In various filter adapter 32, 132 embodiments comprising both a base wall 15 and one or more sidewalls 17, the base wall 15 and sidewalls 17 may be integrally formed or molded together.

In one or more embodiments, the filter adapter 32 further comprises one or more filter fasteners 36, 136 proximate the reservoir opening 34. Various exemplary embodiments of filter fasteners 36, 136 are shown in FIGS. 2-4, 6, 8 and 9. The filter fastener 36, 136 is adapted to removably receive a water filter 38. As such, the filter fastener 36, 136 may comprise any of a variety of fasteners known in the art, such as but not limited to threaded fasteners, clamp fasteners, and the like. In particular embodiments, the filter fastener 36, 136 comprises a lip or any other feature that narrows the reservoir opening 34. For example, in an embodiment wherein the filter fastener 36, 136 comprises a lip, the lip may be sized to allow only a portion of the water filter 38 to pass through the reservoir opening 34 while preventing the entirety of the water filter 38 to pass through the reservoir opening 34. The water filter 38 may comprise a lip that abuts the lip of the filter fastener 36, 136 to prevent passage of the water filter 38 through the reservoir opening 34.

In one or more embodiments, the filter adapter 32 is coupled to a pitcher 2. Typically, the coupling of a filter adapter 32 to a pitcher 2 is of a removable nature, thus allowing a user to freely remove the filter adapter 32 from the pitcher 2 for cleaning or other purposes. In particular embodiments, as shown by the exemplary embodiments illustrated in FIGS. 1-6, the pitcher 2 narrows from the top portion 4 to the base portion 6. With such a configuration, the size of filter adapter 32 relative to the narrowing pitcher 2 prevents the filter adapter 32 from sliding past a desired point within the pitcher 2. In such an embodiment, the filter adapter 32 may comprise a uniform latitudinal dimension, rather than the narrowing dimension of the pitcher 2. This configuration allows water to be transferred or poured from the base portion 6 of the pitcher 2 out of the spout 12 of the pitcher 2. In still other embodiments, the filter adapter 32 may comprise a narrowing dimension, with a channel aligned with the spout 12 for transferring or pouring water out of the pitcher 2. Other configurations of the filter adapter 32 and pitcher 2 are designed such that the filter adapter 32 fits within the pitcher 2 in only one alignment or position.

Referring to FIG. 1, in any of the particular embodiments of a pitcher 2 disclosed herein, whether illustrated in a drawing representing the particular embodiment or not, the pitcher 2 may comprise incremental measurement markings 54 visible from outside the pitcher 2 or through the top opening of the pitcher 2. Such incremental measurement markings 54 may depict how much water remains in the pitcher 2, how much water is necessary to fill the pitcher to capacity, or both. In particular embodiments, the incremental measurement markings 54 are on an exterior surface 24 of the pitcher 2. In other embodiments, the incremental measurement markings 54 are on an inner wall surface 8 of the pitcher 2. Some embodiments include both so that a user can fill the pitcher reservoir to a pre-selected number of markings 56 with knowledge that that many markings 54 worth of space is available in the pitcher 2. The markings 56 on the inside of the reservoir 40 may be spaced to correspond to a volume of water equal to the spacings of the markings 54 on the base portion 6 of the pitcher 2.

In an embodiment, the pitcher 2 comprises a lip 19, channel, or other protrusion extending from the inner wall surface 8 of the pitcher 2 configured to mount the filter adapter 32 within the pitcher 2. In still other embodiments, the filter adapter 32 comprises one or more fasteners configured and positioned to allow the filter adapter 32 extending from an inside surface or adapted to hang from the top 14 of the pitcher 2.

According to various embodiments, a reservoir 30 further comprises a reservoir sleeve 40 that is slidably mounted to the filter adapter 32. Embodiments of the reservoir sleeve 40 may be configured to slide adjacent to the walls of the pitcher 2, between one or more sidewalls 17 of the filter adapter 32 and walls of the pitcher 2, or within one or more sidewalls of the filter adapter 32. For example, in an embodiment wherein the filter adapter 32 comprises only a base wall 15 and no sidewall 17, the reservoir sleeve 40 is configured to slide at least partially adjacent to the walls of the pitcher 2. In embodiments wherein the filter adapter 32 comprises sidewalls 17 in addition to the base wall 15, the reservoir sleeve 40 may be configured to either fit around the sidewalls 17 of the filter adapter 32 (and thus slidable between the sidewalls of the filter adapter 32 and the sides of the pitcher 2) or fit within the sidewalls 17 of the filter adapter 32. In still other embodiments, the filter adapter 32 may comprise an interior sidewall and an exterior sidewall, and a ring-like channel 21 positioned between the interior and exterior sidewalls. The ring-like channel 21 is sized to allow for slidable movement of the reservoir sleeve 40 between the interior and exterior sidewalls and may extend from the base wall 15 to the ends of the sidewalls 17 opposite the base wall 15. Alternatively, the ring-like channel make extend only partially between the base wall 15 and the ends of the sidewall 17 opposite the base wall 15 or even extend below the base wall 15, as shown n FIG. 3. In the exemplary embodiments shown in FIGS. 2-3, the reservoir sleeve 40 fits within sidewalls 17 of the filter adapter 32. In any of the embodiments described herein, an upper volume 11 defined by the available space in the top portion 4 of the pitcher 2 and the sleeve 40 is at least 40% larger when in the expanded position than the upper volume 11 when the sleeve 40 is in the retracted position.

In other embodiments, the reservoir sleeve 40 may be configured to fit around the sidewalls 17 of the filter adapter 32. In such embodiments, the reservoir sleeve 40 may comprise walls shaped or otherwise configured similar to the sidewalls 17 of the filter adapter 32, only relatively larger. This allows the reservoir sleeve 40 to stay in place about the filter adapter 32 as it slides from an expanded position to a retracted position. In a particular implementation wherein the sidewalls 17 of the filter adapter 32 are substantially vertical and not narrowing (as the pitcher narrows), the reservoir sleeve 40 further comprises stabilizing elements. The stabilizing elements are configured stabilize the reservoir sleeve 40 and/or the filter adapter 32 by adding a support in the space left void between the exterior of the filter adapter 32 and the walls of the pitcher 2. In one or more embodiments, the stabilizing elements are substantially triangular or wedge shaped. In other implementations, the stabilizing elements may comprise any shape. In some implementations, the reservoir sleeve 40 further comprises a channel configured to align with the spout 12 of the pitcher 2, the channel so configured to allow water to be poured from the pitcher 2 through the spout 12 even as the reservoir sleeve 40 is in a retracted position.

In various embodiments, a seal may be placed between the filter adapter 32 and the reservoir sleeve 40 to prevent water from leaking out of the filter adapter 32 into the base portion 6 of the pitcher 2. The seal may comprise any seal suitable for sealing the area between the reservoir sleeve 40 and the filter adapter 32, such as but not limited to a replaceable O-ring seal 13, a wiper seal, or an over-molded rubber seal. Also shown in FIG. 2 is a plurality of incremental volume measurements 56 on the reservoir sleeve 40. The incremental volume measurements 56 on the reservoir sleeve 40, like those on the pitcher 2, allow a user to measure the volume of water within the filter adapter 32. Adjacent the incremental volume measurements 56 are contemplated as various numeric volume measurements. By including incremental volume measurements 54, 56, a user may first determine the volume of water necessary in the pitcher 2 for the base portion 6 of the pitcher 2 to be full. The user may then fill the reservoir 30 to a volume similar or equal to the volume needed to fill the pitcher 2 to a desired level, such as full, but not overfill it. A user, however, is not limited to filling the reservoir 30 with only the volume of water required to fill the pitcher 2. For example, a user may include more water in the reservoir 30 than is necessary to fill the bottom portion 6. When the bottom portion 6 is full, the excess water may remain in the reservoir 30 until additional volume is available in the bottom portion 6 and will naturally filter there on its own.

The interaction between the filter adapter 32 and the reservoir sleeve 40 allows for an expandable water reservoir 30 to be created. This increases the efficiency of the pitcher unit by providing a reservoir 30 that holds as much or substantially as much filtered water as the bottom portion 6 may hold. As water is filtered through the filter 38, the reservoir sleeve 40 may gradually be lowered as well, or may alternatively be lowered from an expanded position to a collapsed position when the water line is below the top 14 of the pitcher 2. In particular embodiments, the reservoir 30 or components thereof are removable when filled with water to allow a user to easily empty an overfilled reservoir without disturbing the filtered water in the pitcher 2.

Figure 10:
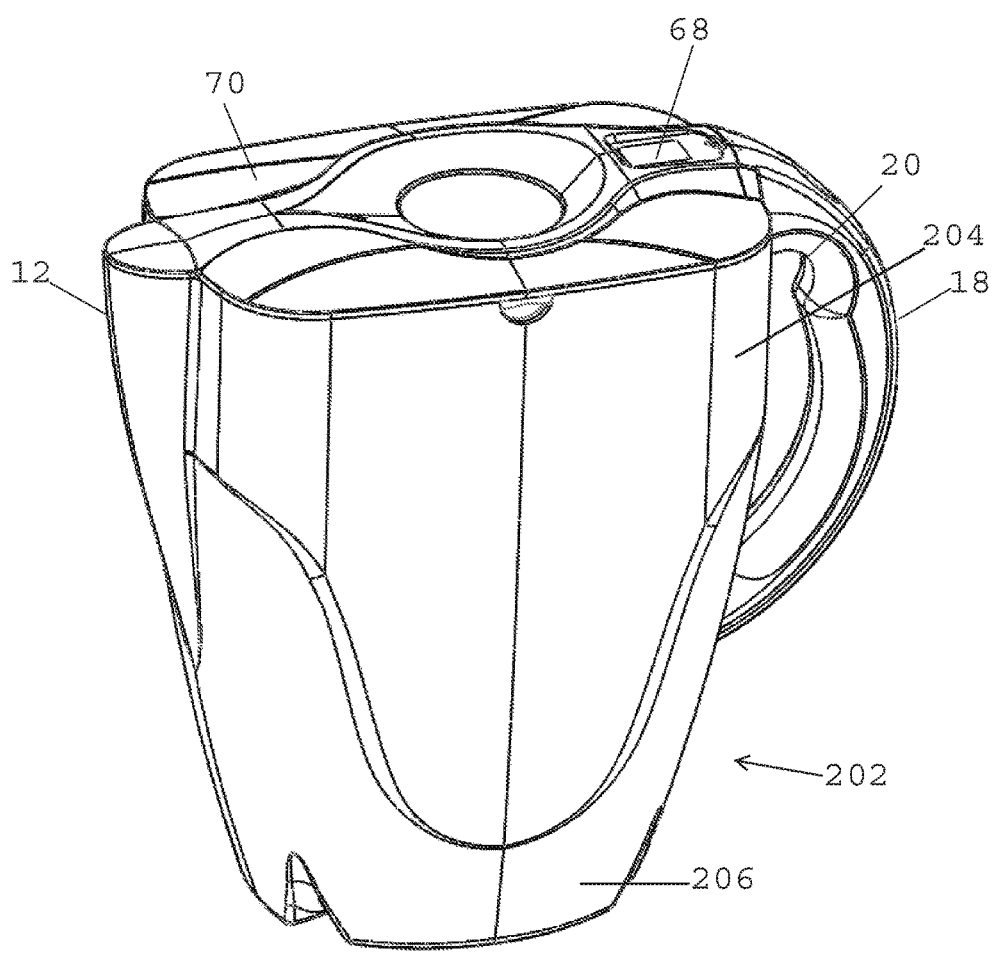
FIG. 10 is a perspective view of a fifth embodiment of an expandable water-filtering pitcher.
Figure 11:
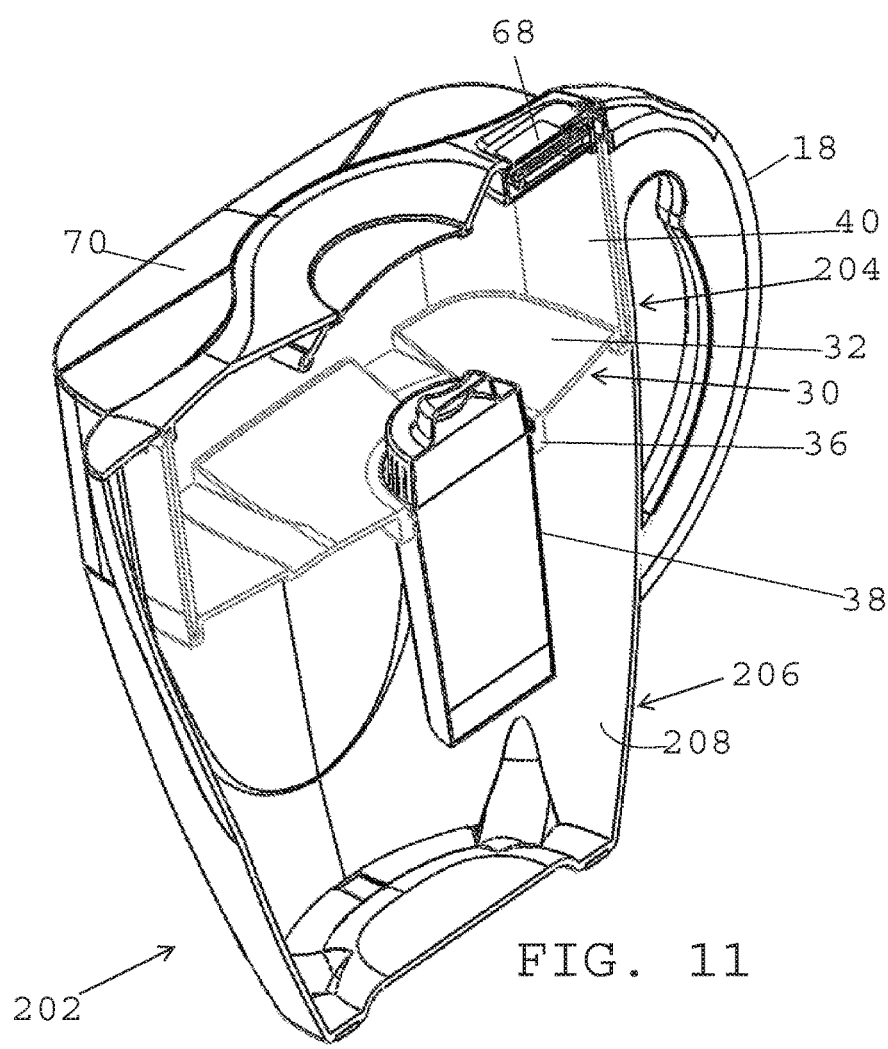
FIG. 11 is a cross-sectional view of a fifth embodiment of an expandable water-filtering pitcher.

Referring to FIGS. 10 and 11, views of a pitcher 202 with a reservoir sleeve 40 of the reservoir 30 are shown in a retracted or collapsed position. When in a retracted position, the reservoir sleeve 40 is at or near the plane formed at the top 14 of the pitcher 202. In other embodiments, the reservoir sleeve 40 may drop below the plane of the top 14 of the pitcher 202 when in a retracted position.

When in a retracted position, the reservoir sleeve 40 may rest in a ring-like channel 21 adjacent the base wall 15 of the filter adapter 32 or on some other support extending from a wall of the filter adapter 32 or pitcher 2, 202. The reservoir sleeve 40 may further comprise a lip at the top that rests on the top 14 of the pitcher 2, 202 or a ledge formed on an interior wall of the pitcher 2, 202. The embodiment illustrated in FIGS. 10 and 11 also comprises a filter replacement display 68 that indicates how long the water filter 38 has been in use or when the filter needs to be replaced. The filter replacement display 68 is typically housed in the lid 70, but may alternatively be mounted to a wall of the pitcher 202 or on the water filter 38 itself. In one or more embodiments, the lid 70 comprises a flapper hingedly coupled to the lid 70 that covers the spout 12 of the pitcher 2, 202. The flapper may comprise a counting device that counts the number of times water has been poured out of the pitcher 2, 202. At a certain predetermined times or intervals, the counting device may signal that the water filter 38 should be changed. In some aspects, the counting device may further measure how long the flapper is open and/or the amount of water flow out of the spout, thus providing a more accurate measure of the among of water being dispensed from the pitcher 2, 202.

As further illustrated in FIGS. 1, 10, and 11, a pitcher 2, 202 with an expandable reservoir 30 may further work in conjunction with a lid 70. The lid 70 typically fits over the top 14 of the pitcher 2, 202 and reservoir 30 when the reservoir sleeve 40 is in a retracted position. In some implementations, however, the lid 70 is adapted to fit over the reservoir sleeve 40 even when the reservoir sleeve 40 is in an expanded position. In still other implementations, a separate lid may be configured to cover just the sleeve 40, while the typical lid 70 covers the pitcher 2, 202, sleeve 40, and filter adapter 32.

Figure 4:
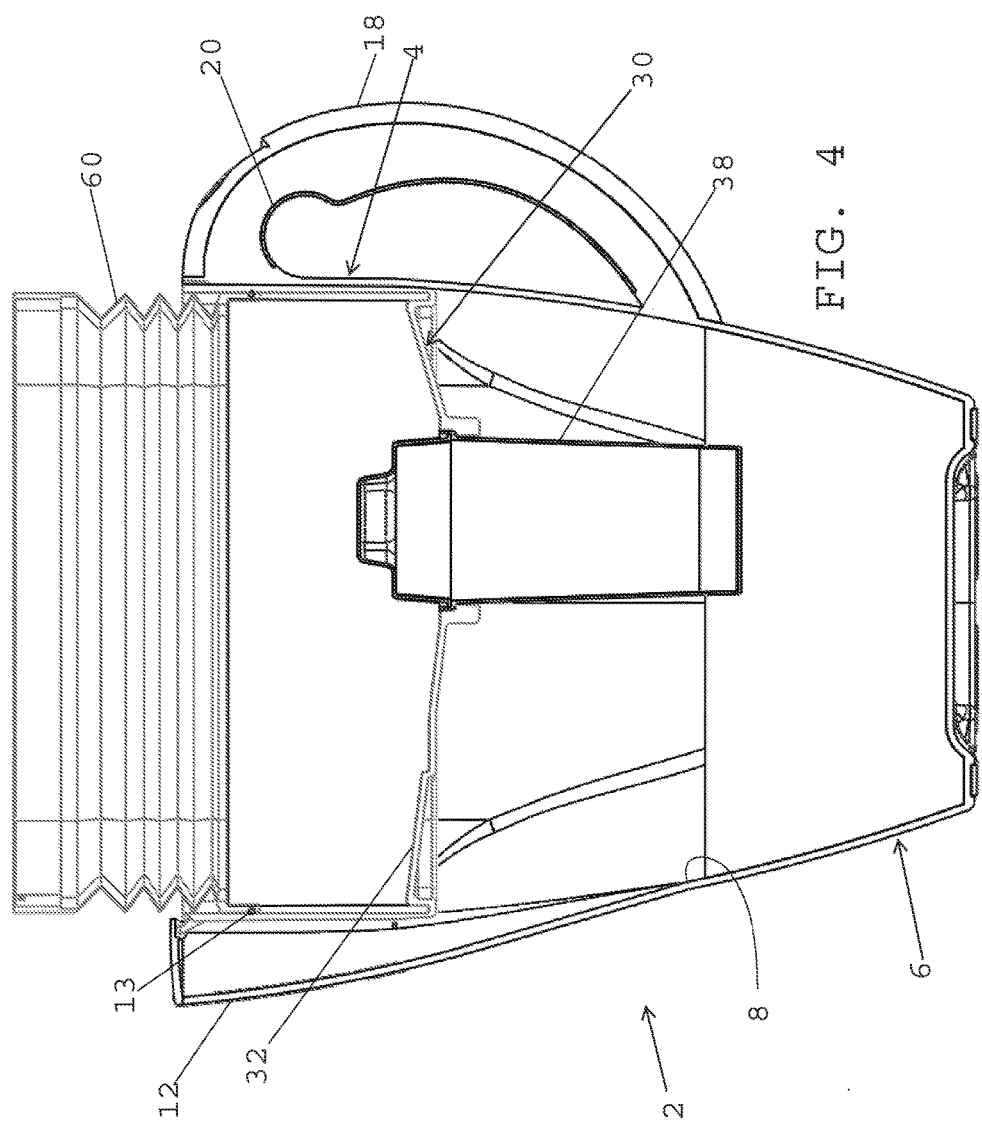
FIG. 4 is a cross-sectional side view of a second embodiment of an expandable water-filtering pitcher.
Figure 5:
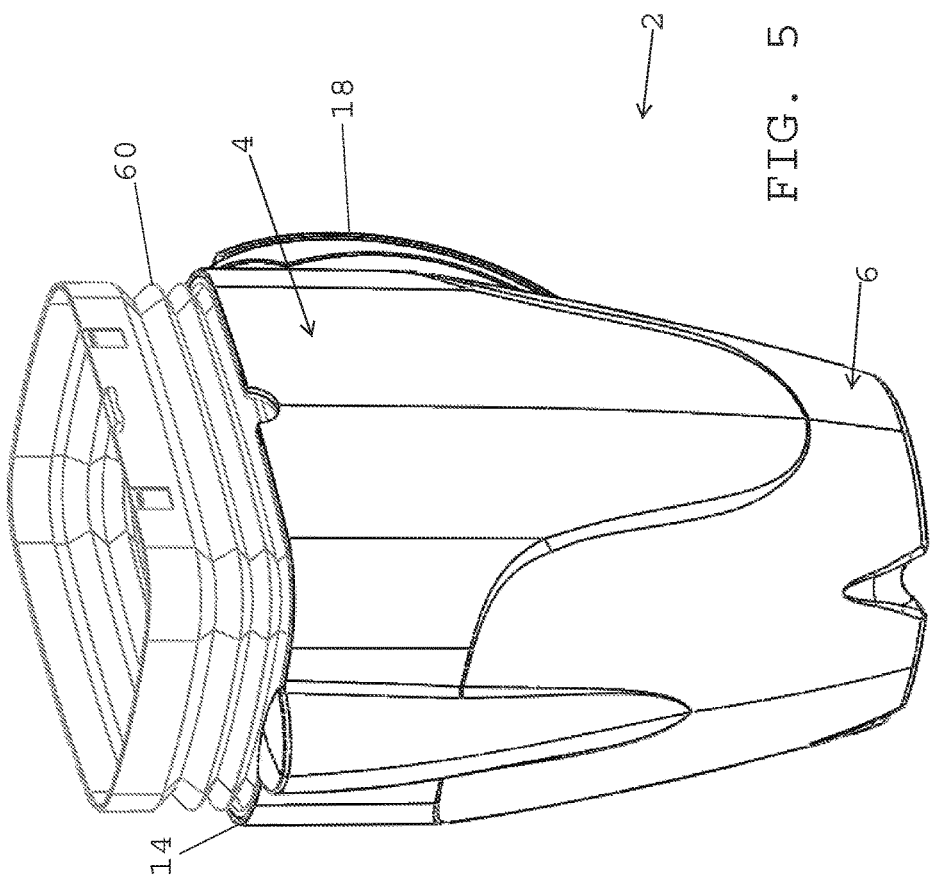
FIG. 5 is a perspective view of a second embodiment of an expandable water-filtering pitcher.

In one or more embodiments, the reservoir sleeve comprises a collapsible reservoir sleeve. For example, the reservoir sleeve may comprise an accordion-like pleated collapsible sleeve 60, a non-limiting example of which is illustrated in FIGS. 4 and 5. The pleated collapsible sleeve 60 is configured to repeatedly stretch to an expanded position and collapse to a retracted position. In FIGS. 4 and 5, the pleated collapsible sleeve 60 is shown in at least a partially expanded position. The pleated collapsible sleeve 60 may be coupled proximate the top 14 of the pitcher 2 or filter adapter 32, or may alternatively be slidably mounted to the filter adapter filter adapter 32 as the previously described reservoir sleeve 40 is slidably mounted. When water is placed within the pleated collapsible sleeve 60, the existence of the water and outward pressure of the water against the pleated collapsible sleeve 60 maintains the sleeve in an open position by straightening the pleats due to the weight of the water. As the water flows through the water filter into the base portion 6, the weight of the water reduces, allowing the collapsible sleeve 60 to regain its original shape and collapse.

Figure 6:
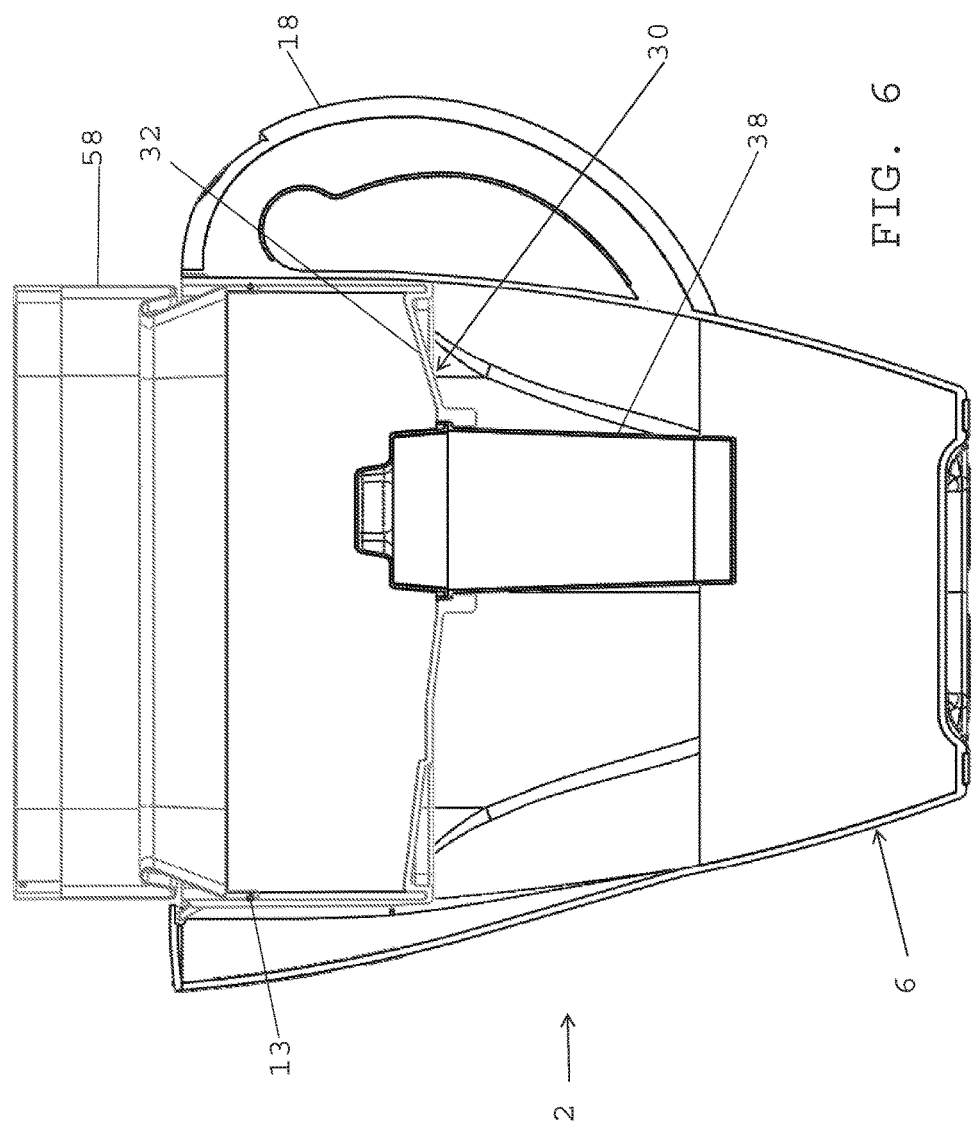
FIG. 6 is a cross-sectional side view of a third embodiment of an expandable water-filtering pitcher.

In other embodiments, reservoir sleeve comprises a flexible bag 58, an example of which is shown in FIG. 6. Like the pleated collapsible sleeve 60, the flexible bag 58 is configured to repeatedly open to an expanded position and collapse to a retracted position. In FIG. 6, the flexible bag 58 is shown in a partially expanded position. The flexible bag 58 may be coupled proximate the top 14 of the pitcher 2 or filter adapter 32, or may alternatively be slidably mounted to the filter adapter 32 as the previously described reservoir sleeve 40 is slidably mounted.

Figure 12:
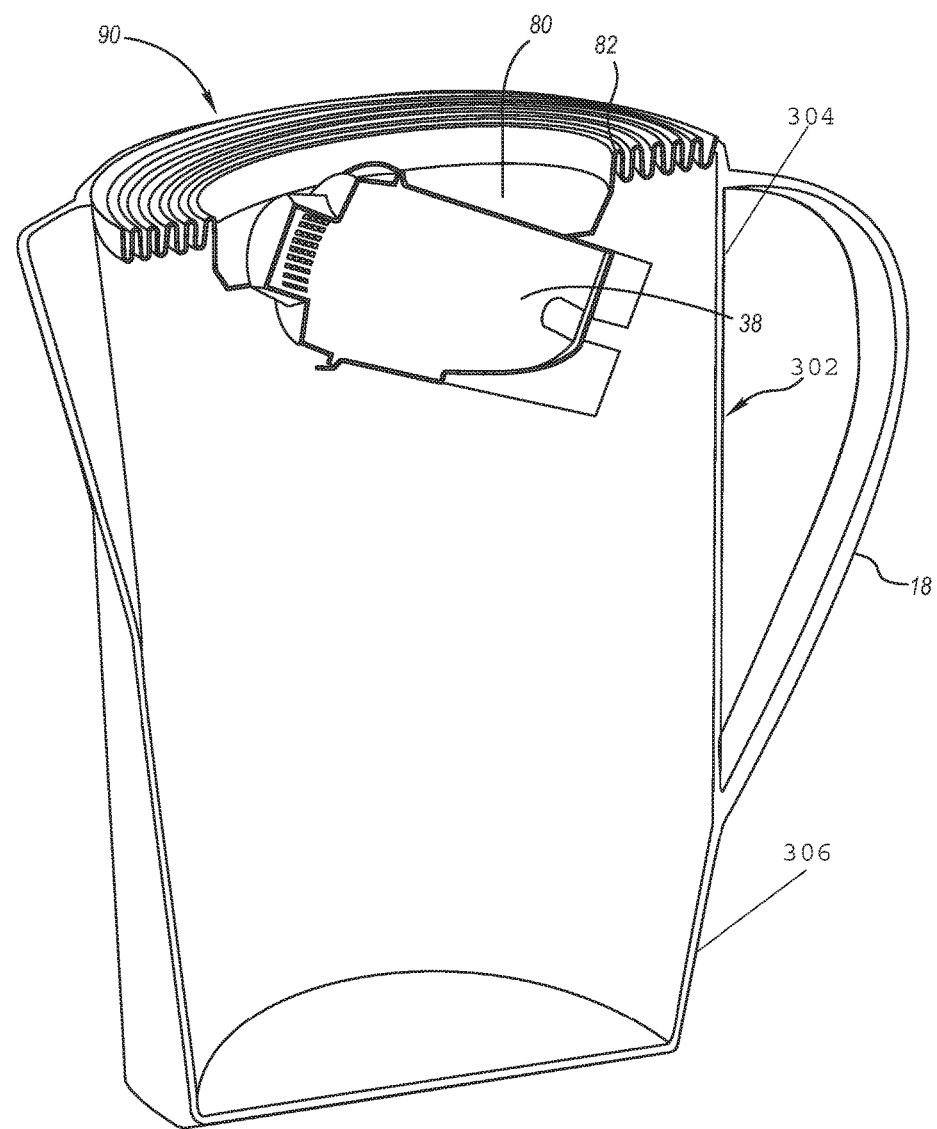
FIG. 12 is a cross-sectional view of a sixth embodiment of an expandable water-filtering pitcher with an expandable reservoir in a retracted position.
Figure 13:
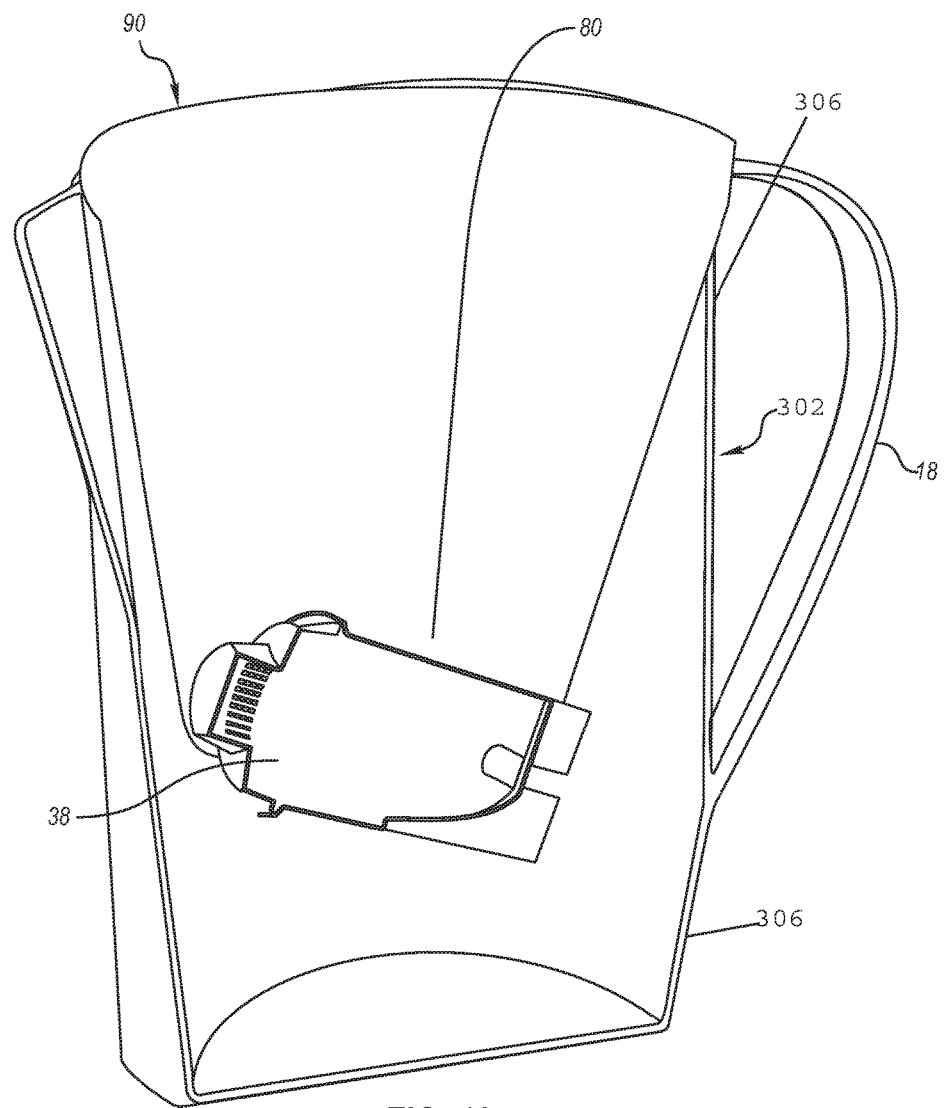
FIG. 13 is a cross-sectional view of a sixth embodiment of an expandable water-filtering pitcher with an expandable reservoir in an expanded position.

FIGS. 12 and 13 illustrate another exemplary embodiment of an expandable reservoir 90. Like embodiments previously described, the reservoir 90 is coupled to a pitcher 302 comprising a base portion 306 and a top portion 304. The reservoir 90, however, expands down into the base portion 306 of the pitcher rather than upward from the pitcher top. The expandable reservoir 90 expands to an expanded position (shown in FIG. 13) when water is placed into the expandable reservoir 90 due to the weight of the water. As water filters through the water filter 38 and the weight or pressure on the expandable reservoir 90 decreases, the expandable reservoir 90, due to the elasticity of the material forming the expandable reservoir 90, is configured to retract to the retracted position (shown in FIG. 12).

The expandable reservoir 90 is typically comprised of a one or materials that allow the expandable reservoir 90 to expand when water is added to the expandable reservoir and retract when water is eliminated from the expandable reservoir 90. For example, the expandable reservoir may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing. In a particular embodiment, the expandable reservoir 90 comprises a membrane comprising one or more of the following: elastic, silicone rubber, or thermoplastic polyolefin elastomer. As shown in FIG. 12, the expandable reservoir 90 comprises one or more pleats 82 molded into the expandable reservoir 90. The pleats 82 are positioned and configured to assist in holding the form and/or shape of the expandable reservoir when in the retracted or empty position.

The water filter 38 used in combination with the expandable reservoir 90 may comprise a typical water filter 38 or a water filter 38 designed especially for the expandable reservoir 90. For example, the water filter 38 may be designed, in combination with the filter adapter 80, to rest at an angular or horizontal position, rather than the typical vertical position (shown in FIGS. 2-4). As such, configuration of the water filter 38 may be altered to allow for efficient filtering when the water filter 38 is not positioned vertically. The water filter 38, like with previous embodiments, engages with the filter adapter 80 at the bottom of the reservoir 90. Those of ordinary skill in the art will readily understand how to configure an engagement mechanism to engage the water filter 38 at an angle rather than vertically, given the disclosure herein of an angled or horizontal filter engaged with the filter adapter 80. The filter adapter 80 may comprise the same expandable materials as the reservoir 90 or, alternatively may comprise a harder plastic or rigid material that supports the water filter 38 at the desired angle. The filter adapter 80 may comprise a water filter receiver 308 in which the water filter 38 sits and couples to the filter adapter 80. In particular embodiments, the water filter receiver 308 comprises a snap-receiver to hold the water filter 38 through mechanical engagement. In other embodiments, like the previous embodiments, a portion of the external surface of the water filter 38 is threaded or comprises bayonets to engage with a mating structure on the filter adapter 80.

Figure 7:
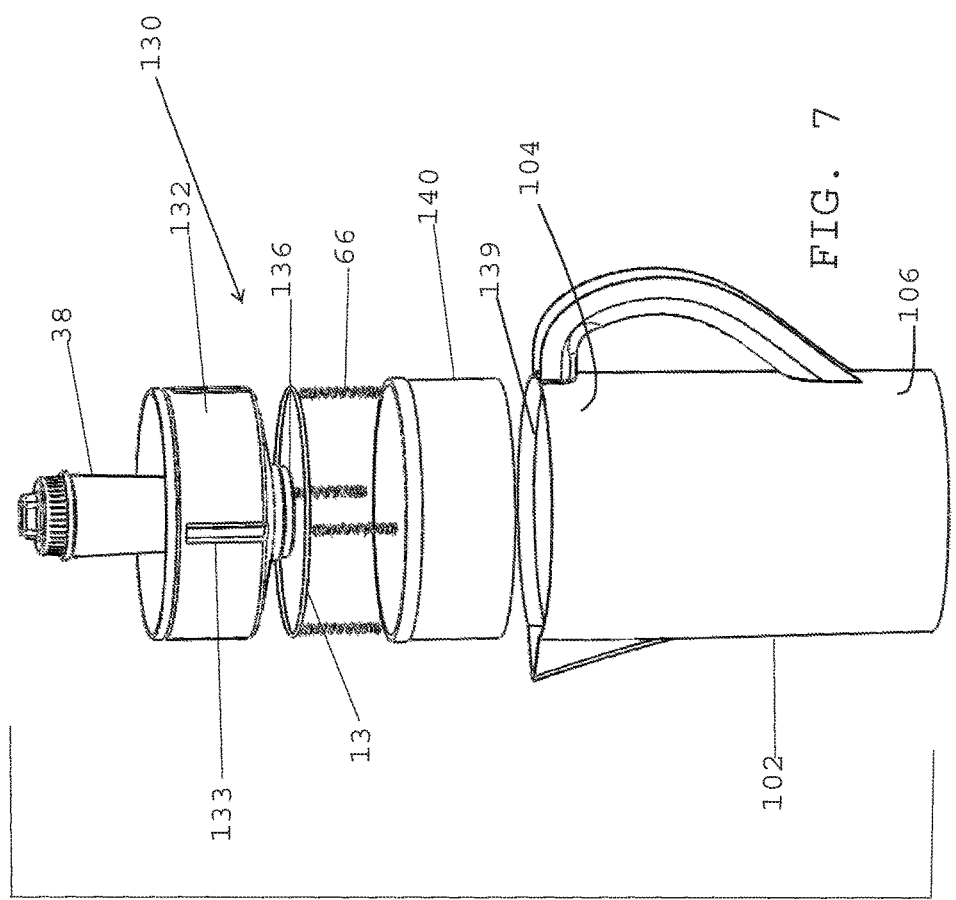
FIG. 7 is an exploded view of a fourth embodiment of an expandable water-filtering pitcher.
Figure 8:
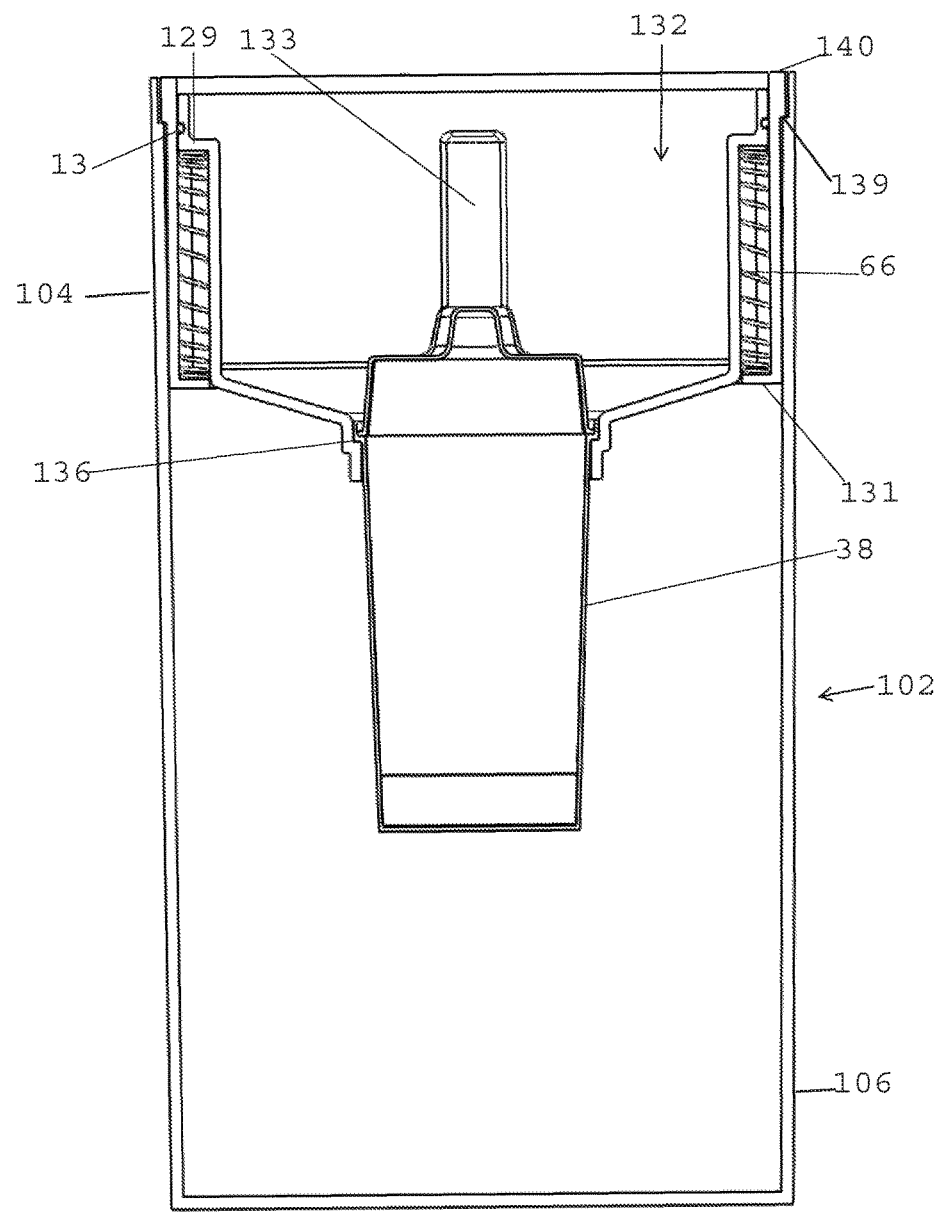
FIG. 8 is cross-sectional view of a fourth embodiment of an expandable water-filtering pitcher with the filter adapter in a retracted position.
Figure 9:
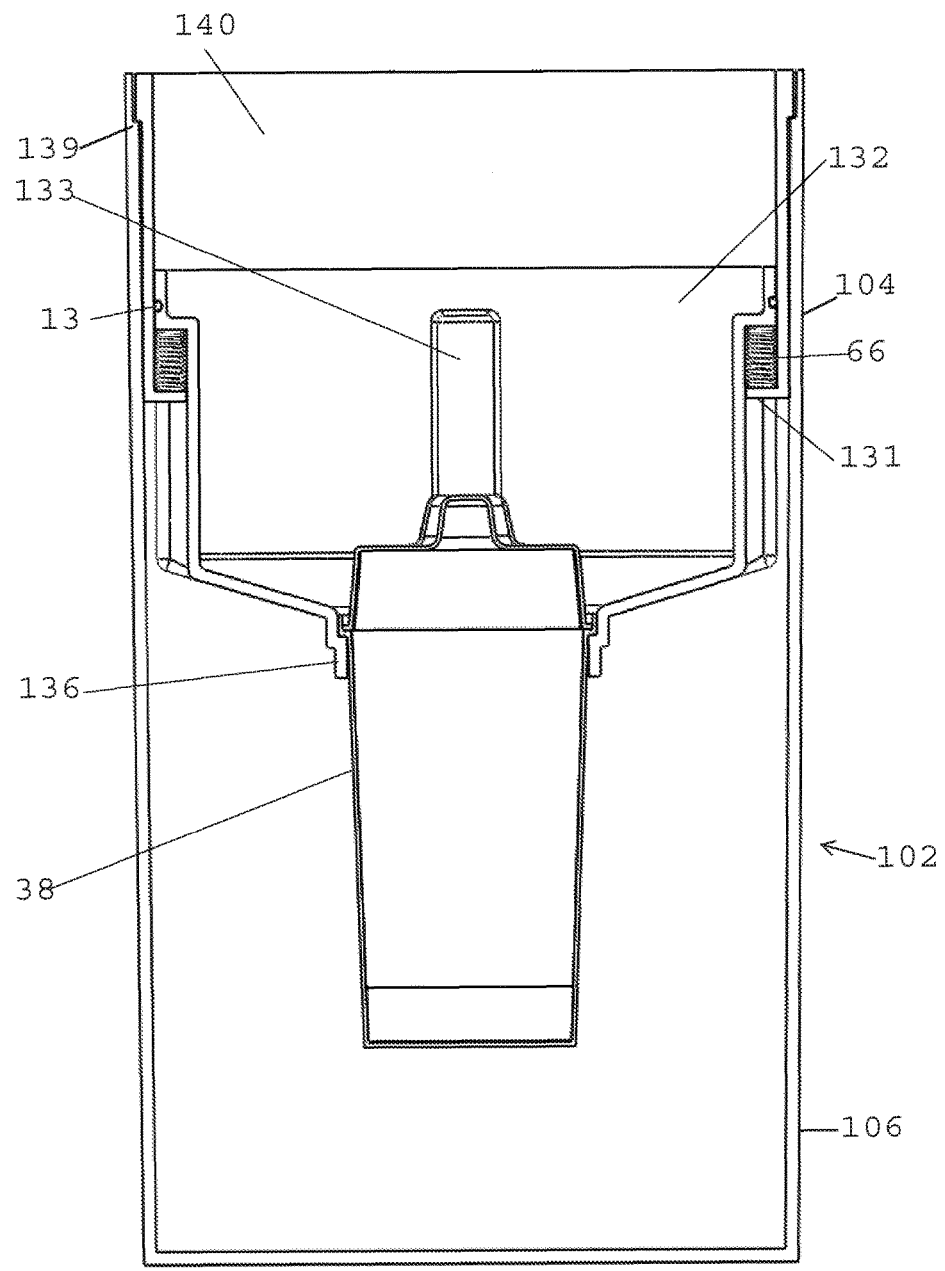
FIG. 9 is a cross-sectional view of a fourth embodiment of an expandable water-filtering pitcher with the filter adapter in an expanded position.

Also contemplated herein is an expandable water pitcher that comprises one or more biasing members 66, a non-limiting example of which is illustrated in FIGS. 7-9. FIG. 7 illustrates an exploded view of an exemplary embodiment, which comprises a pitcher 102 comprising a base portion 106 and a top portion 104, and a reservoir 130. A water filter 38 may also be included before or after assembly. The pitcher 102 shown in FIGS. 7-9 may comprise any pitcher previously described herein or otherwise known in the art. The reservoir 130 comprises a filter adapter 132, a sleeve 140, and one or more biasing members 66. An o-ring 13 may also be included. One or more embodiments of the filter adapter 132 comprise one or more guide channels 133 positioned to align with and guide the one or more biasing members 66. The pitcher 102 may comprise a lip 139 that extends inward into the pitcher 102 and supports the sleeve 140 when the sleeve 140 is within the pitcher 102.

FIGS. 8 and 9 show cross-sectional views of the pitcher 102 and filter adapter 136 with the reservoir sleeve 140 in an expanded position (FIG. 9) and a collapsed position (FIG. 8). Whereas in some of the other embodiments described herein the filter adapter 32 remains stationary while the sleeve 40 is slidable, in the embodiment shown in FIGS. 7-9, the sleeve 140 remains stationary while the filter adapter 132 moves to expand the reservoir 130. FIG. 8 shows the filter adapter 132 in a collapsed position with minimal or no water in the reservoir 130. In the collapsed position, the biasing members 66, positioned within the guide channels 133, bias the filter adapter 132 upward or toward the top 14 of the pitcher 102. Each biasing member 66 is positioned between a sleeve lip 131 and a filter adapter lip 129. In FIGS. 7-9, the biasing members comprise springs. In other embodiments, however, the biasing members may comprise any biasing element known in the art and configured to bias the filter adapter 132 upward.

FIG. 9 illustrates the filter adapter 132 in an expanded position typical of an at least partially full reservoir 130. As water is added to the reservoir 130, the weight of the water overcomes biasing of the biasing members 66, thus lowering the filter adapter 132 and exposing the sleeve 140 so that the available volume of the reservoir 130 to hold water is enlarged. As water is filtered through the filter 38, the weight on the filter adapter 132 is reduced and the biasing members bias the filter adapter 132 towards the top 14 of the pitcher 102.

In other embodiments, no sleeve 140 is required in the reservoir 130. Rather, a lip is formed on an interior surface of the pitcher 102 that replaces the sleeve lip 131. In such an embodiment, each biasing member is positioned between the filter adapter lip 129 and the pitcher lip which like the sleeve lip 131 extends inward of the pitcher wall, and the reservoir functions similar to that previously described.

Unless otherwise specified, the water filter 38 may comprise any replaceable water filter 38 known in the art that allows water to pass through the reservoirs described herein through the water filter 38 and into the pitcher 2, 102, 202, 302. As the water filter 38 is typically configured for easy removal and replacement such as with a bayonet or large thread connector on the external surface of the filter and a corresponding, mating, connector on an internal surface of the opening of the adapter filter 136. The pitcher 2, 102, 202, 302 and filter adapters disclosed herein may be sold independently of the water filter 38, and it is anticipated that water filter 38 replacements will be sold separately.

It will be understood that implementations are not limited to the specific components disclosed herein, as virtually any components consistent with the intended operation of a method and/or system implementation for an expandable water filtering pitcher may be utilized. Accordingly, for example, although particular pitchers, filters, sleeves, and filter adapters may be disclosed, such components may comprise any shape, size, style, type, model, version, class, grade, measurement, concentration, material, weight, quantity, and/or the like consistent with the intended operation of a method and/or system implementation for an expandable water filtering pitcher may be used. For example, any of the reservoirs and sleeves described herein may comprise a variety of materials, such as but not limited to hard or soft plastics, rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

The concepts disclosed herein are not limited to the specific implementations shown herein. For example, many additional components and assembly procedures known in the art consistent with the intended expandable water filtering pitcher and/or assembly procedures for an expandable water filtering pitcher will become apparent for use with implementations of an expandable water filtering pitcher from this disclosure. Accordingly, for example, although particular pitchers, filters, filter adapters, and sleeves are disclosed, such pitchers, filters, filter adapters, and sleeves and implementing components may comprise any shape, size, style, type, model, version, measurement, concentration, material, quantity, and/or the like as is known in the art for such water filtering pitchers and implementing components, consistent with the intended operation of a water filtering pitcher.

Furthermore, embodiments of the expandable water filtering pitcher may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an expandable water filtering pitcher, it should be readily apparent that a number of modifications may be made without departing from the spirit thereof and that these implementations may be applied to other an expandable water filtering pitcher. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A water-filtering pitcher comprising:
a pitcher having a top, a base and an inner wall surface extending between the top and the base and defining an internal volume of the pitcher;
a spout at the top at a pitcher opening;
a filter adapter movably positioned within the internal volume of the pitcher, the filter adapter configured to receive a water filter within the filter adapter, the filter adapter movable between a first position closer to the base and a second position closer to the top;
a plurality of bias members positioned between the filter adapter and the pitcher base, the plurality of bias members configured to bias the filter adapter upward away from the base and toward the top of the pitcher;
wherein, when the water filter is received through the top of the pitcher to the filter adapter and water is filtered from above the filter adapter through the water filter and into the base of the pitcher, the bias members bias the filter adapter and water filter from the first position towards the second position.

2. The water-filtering pitcher of claim 1, further comprising a filter replacement display coupled to the pitcher, the replacement display responsive to a counting device operatively associated with the spout of the pitcher and counting movement of the spout on the pitcher.

3. The water-filtering pitcher of claim 2, wherein the counting device is configured to count the number of pours of liquid from the pitcher and the filter replacement display is configured to indicate when an approximated threshold for expiration of the filter is reached based on an approximated volume of water poured through the spout.

4. The water-filtering pitcher of claim 1, further comprising an o-ring seal between the filter adapter and the inner wall surface of the pitcher, wherein the o-ring seal is configured to restrict water passing between the filter adapter and the inner wall surface.

5. The water-filtering pitcher of claim 1, wherein the plurality of bias members are each springs.

6. A water-filtering pitcher comprising:
a pitcher having a top, a base and an inner wall surface extending between the top and the base and defining an internal volume of the pitcher;
a filter adapter positioned within the internal volume of the pitcher between the top and the base, the filter adapter comprising an opening therethrough configured to pass water from the top of the pitcher above the filter adapter to the base of the pitcher below the filter adapter, the filter adapter configured to receive a water filter within opening, wherein the filter adapter is further configured to move between a first position closer to the base and a second position closer to the top;

one or more bias members positioned between the filter adapter and the pitcher base, the plurality of bias members configured to bias the filter adapter upward, away from the base and toward the top of the pitcher;

wherein, when the water filter is received in the opening in the filter adapter and a weight of water is added above the filter adapter, the filter adapter moves towards the first position under the weight of water, and as water is filtered from the top of the pitcher through the water filter and into the base of the pitcher, the bias members bias the filter adapter and water filter from the first position towards the second position.

7. The water-filtering pitcher of claim 6, further comprising a filter replacement display coupled to the pitcher, the replacement display responsive to a counting device operatively associated with movement of the pitcher.

8. The water-filtering pitcher of claim 7, wherein the counting device is configured to count the number of pours of liquid from the pitcher and the filter replacement display is configured to indicate when an approximated threshold for expiration of the filter is reached based on an approximated volume of water poured from the pitcher.

9. The water-filtering pitcher of claim 6, further comprising a seal between the filter adapter and the inner wall surface of the pitcher, the seal configured to restrict water passing between the filter adapter and the inner wall surface.

10. The water-filtering pitcher of claim 6, further comprising a reservoir sleeve and wherein the one or more bias members comprise a plurality of bias members, and wherein the plurality of bias members are positioned between the reservoir sleeve and the filter adapter.

11. The water-filtering pitcher of claim 6, wherein the one or more bias members are each springs.

12. A water-filtering pitcher comprising:
a pitcher having a top, a base and an inner wall surface extending between the top and the base and defining an internal volume of the pitcher;
a filter adapter positioned within the internal volume of the pitcher between the top and the base, wherein the filter adapter is configured to move between a first position closer to the base and a second position closer to the top;
one or more bias members positioned between the filter adapter and the pitcher base, the plurality of bias members configured to bias the filter adapter upward, away from the base and toward the top of the pitcher;
wherein as water is filtered from the top of the pitcher through the filter adapter and into the base of the pitcher, the bias members bias the filter adapter from the first position towards the second position.

13. The water-filtering pitcher of claim 12, further comprising a filter replacement display coupled to the pitcher, the replacement display responsive to a counting device operatively associated with movement of the pitcher.

14. The water-filtering pitcher of claim 13, wherein the counting device is configured to count the number of pours of liquid from the pitcher and the filter replacement display is configured to indicate when an approximated threshold for expiration of the filter is reached based on an approximated volume of water poured from the pitcher.

15. The water-filtering pitcher of claim 12, further comprising a seal between the filter adapter and the inner wall surface of the pitcher, the seal configured to restrict water passing between the filter adapter and the inner wall surface.

16. The water-filtering pitcher of claim 12, further comprising a reservoir sleeve and wherein the one or more bias members comprise a plurality of bias members, and wherein the plurality of bias members are positioned between the reservoir sleeve and the filter adapter.

17. The water-filtering pitcher of claim 12, wherein the one or more bias members are each springs.

\* \* \* \* \*